United States Patent [19]

Adachi et al.

[11] Patent Number: 4,812,975

[45] Date of Patent: Mar. 14, 1989

[54] EMULATION METHOD

[75] Inventors: Shigemi Adachi, Owariasahi; Yoshitake Nakaosa, Yokohama; Yoshiki Fujioka, Aichi, all of Japan

[73] Assignee: Hitachi, Ltd., Tokyo, Japan

[21] Appl. No.: 629,808

[22] Filed: Jul. 11, 1984

[30] Foreign Application Priority Data

Jul. 11, 1983 [JP] Japan .................................. 58-126322

[51] Int. Cl.⁴ .............................................. G06F 9/44
[52] U.S. Cl. ..................................... 364/300; 364/200
[58] Field of Search .............. 364/300, 200 MS File, 364/900 MS File

[56] References Cited

U.S. PATENT DOCUMENTS

| | | | |
|---|---|---|---|
| 3,955,180 | 5/1976 | Hirtle | 364/200 |
| 3,997,895 | 12/1976 | Cassonnet et al. | 364/200 |
| 4,031,517 | 6/1977 | Hirtle | 364/200 |
| 4,084,235 | 4/1978 | Hirtle et al. | 364/200 |
| 4,370,709 | 1/1983 | Fosdick | 364/200 |
| 4,434,462 | 2/1984 | Guttag et al. | 364/200 |
| 4,482,953 | 11/1984 | Burke | 364/200 |
| 4,587,612 | 5/1986 | Fisk et al. | 364/200 |
| 4,727,480 | 2/1988 | Albright et al. | 364/200 |

Primary Examiner—Gareth D. Shaw
Assistant Examiner—Christina M. Eakman
Attorney, Agent, or Firm—Antonelli, Terry & Wands

[57] ABSTRACT

A method for emulating programs in a system includes a plurality of first and second data processors having different instruction word sets. An instruction which interrupts the operating system on the first data processor is defined. When the instruction is detected in a program running on the first data processor, it is determined whether or not the instruction is an instruction associated with an input/output macro instruction. If it is found, as a result of the determination, that this is the case, an interrupt is caused in a program running on the second data processor which controls the emulation, and the input/output macro instruction output from an emulated program is translated into an input/output macro instuction for the operating system, thereby implementing an emulation with a minimized overhead.

3 Claims, 2 Drawing Sheets

EMULATION METHOD

BACKGROUND OF THE INVENTION

The present invention relates to an emulation method, and in particular, to a method for emulating programs in a system comprising a plurality of data processors which operate with different instruction word sets.

In an ordinary data processor, a group of programs, that is, instruction words intrinsic to the data processor is provided, and the function of each instruction word is defined by an operation code specified in a predetermined field of the instruction word.

On the other hand, there arises a problem when an existing data processor of the old type is replaced with a new model in that the programs running on the old-type data processor must be adapted to the new model. If the source programs of these programs are constructed with a high level language, they can be utilized as the object programs on the new data processor (to be referred to as a native machine hereafter) by recompiling the source programs at system conversion. Actually, however, the complete compatibility cannot be implemented between these data processors in many cases because of the discrepancy existing between the language specifications of the respective data processors. As a result, program modification is necessary and thus the necessary volume of human work will be increased, for example, for the test run to be conducted after the program compilation. Consequently, an emulation is necessary if a program running on an old-type data processor (to be referred to as a target machine hereafter) is to be executed on a native machine without modifying the program even when there does not exist a compatibility in architecture between these target and native machines, or if a program which runs on a virtual computer having the different architecture is to be executed on an existing data processor. In the emulation, functions of the native machine are expanded or modified by use of microprogramming, thereby realizing a high-speed execution of a program used in a data processor having the different architecture.

To conduct an emulation, the emulation of input/output instructions will become an essential factor. For example, when a program running on a data processor having an input/output instruction set not designed for a channel configuration is to be emulated on a data processor having an input/output instruction set designed for a channel configuration, it will be difficult to conduct the emulation only by use of microprograms because of a considerable difference between the hardware systems of these data processors.

In general, such a data processor having the input/output instruction set of other than the channel type must issue a plurality of input/output instructions to perform an input/output operation. In contrast to this data processor, a data processor having an input/output instruction set of the channel type issues only an input/output initiate (SIO) instruction to carry out an input/output operation.

For example, when a seek operation and a read operation are to be conducted on a magnetic disk unit, an SIO instruction is issued for the channel if the channel-type input/output instruction set is utilized, provided that the seek and read operations have been specified with a channel command word (CCW) by use of a command chain. On the other hand, with the input/output instruction set of other than the channel type, the parameters necessary for the seek and read operations are sequentially written in a group of the pertinent input/output control registers disposed in the disk control unit and the input/output operation is initiated. In a data processing system having an input/output instruction set not designed for a channel configuration as explained above, a plurality of input/output instructions are required to be issued to execute the seek and read operations.

Therefore, if a native machine having the channel-type input/output instruction set is used to emulate an input/output instruction of other than the channel type, an interface program is initiated each time a write input/output (WIO)- instruction is issued for performing an interpreting processing for the WIO instruction, and a set of WIO instructions are replaced with an input/output macro instruction of the channel type or one for the new operating system.

It will be apparent that the software overhead required for the interpreting processing of WIO instructions increases in this situation. Like batch processing, if a high-speed operation is not required for a program which performs an emulation, the method described above will not lead to any serious problems. However, like a program in an online system, if a rapid response is necessary for an emulation program and if such input/output operations are carried out frequently, this method cannot be regarded as preferable with respect to the performance.

SUMMARY OF THE INVENTION

Accordingly, an object of the present invention is to provide an emulation method which enables an emulation with a reduced overhead.

Another object of the present invention is to provide an emulation method which makes it possible to convert the input/output macro instructions in a program to be emulated at the macro instruction level into the corresponding input/output macro instructions in an emulating program.

The present invention is materialized in a system comprising data processors, for example, a first data processor and a second data processor which have a different instruction word set, respectively. It is assumed that the user programs in the first data processor are processed under control of a first operating system and that those in the second data processor are processed under control of a second operating system. The programs in the first data processor are assigned as the programs to be emulated (to be referred to as emulated programs hereafter) and the specific instructions are defined in these emulated programs. Such an instruction like a supervisor call instruction, is one that causes an interrupt in the first operating system. When.. the interrupt instruction is detected, it is examined to determine whether or not this is an interrupt instruction associated with an input/output control macro instruction. If it is found, as the result of the examination, that this is the case, an interrupt occurs in a program on the second data processor which controls the emulation. Then, the input/output control macro instructions issued by the emulated program are translated into the corresponding input/output control macro instructions for the second operating system.

Since the emulation can be conducted at the translated macro instruction level rather than at the machine language level, the input/output control instructions which occur frequently are executed with a relatively low overhead.

DESCRIPTION OF THE PREFERRED EMBODIMENT

Figure 1:
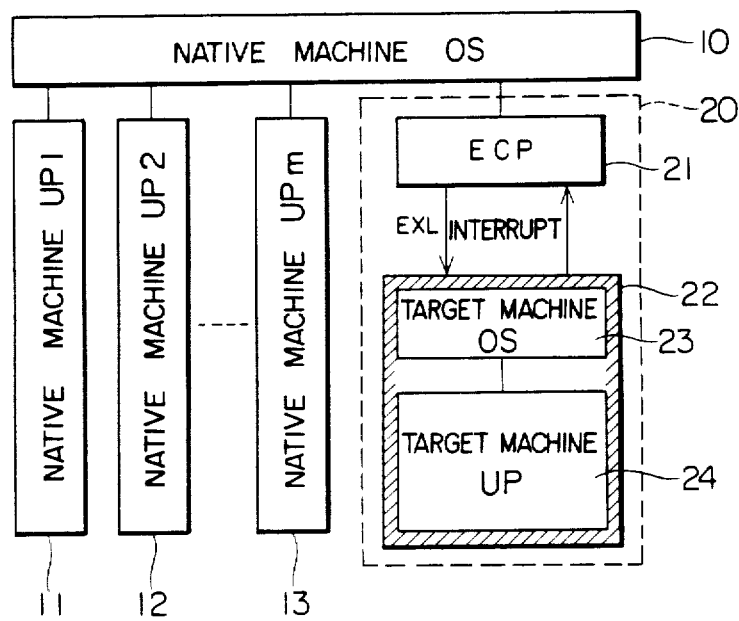
FIG. 1 is a block diagram illustrating the operating system configuration as an embodiment in accordance with the present invention.

FIG. 1 depicts the operating system configuration. In this system, an operating system 10 of the native machine (new data processor) controls a plurality of native machine user programs 11-13 by use of an instruction word set. Furthermore, it also controls the jobs of, the target machine (old data processor). These operations are collectively referred to as an emulation job 20. In the emulation job 20, an emulated program 22 contains a target machine user program 24 and a target machine operating system 23 which controls the user program 24. The instruction word set to be used by the user program 24 and the operating system 23 is different from that used on the native machines described above. An emulation control program (to be abbreviated as ECP hereafter) 21 resides between the emulated program 22 and the native machine operating system 10 and functions as an interface program. The ECP 21 initiates the emulation by issuing an Execute Local (EXL) instruction to the emulated program 22 and translates the input/output control macro instructions issued in the target machine user program 24 into the corresponding input/output control macro instructions for the native machine operating system 10.

Figure 2:
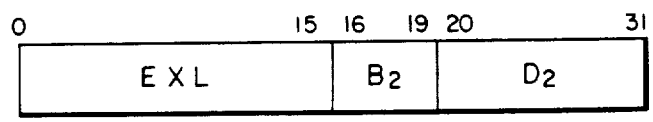
FIG. 2 depicts the format of an EXL instruction.

FIG. 2 illustrates the format of an EXL instruction.

The EXL instruction is issued by the ECP 21 operating in the native mode to initiate the emulated program 22. In accordance with this instruction, the program processing state is changed to an operation mode in which the emulator for performing the emulation operates, and the program status word (PSW) containing the program counter, condition code, input/output mask, and the like, and the relevant general-purpose registers etc. are set as will be described later.

Figure 4:
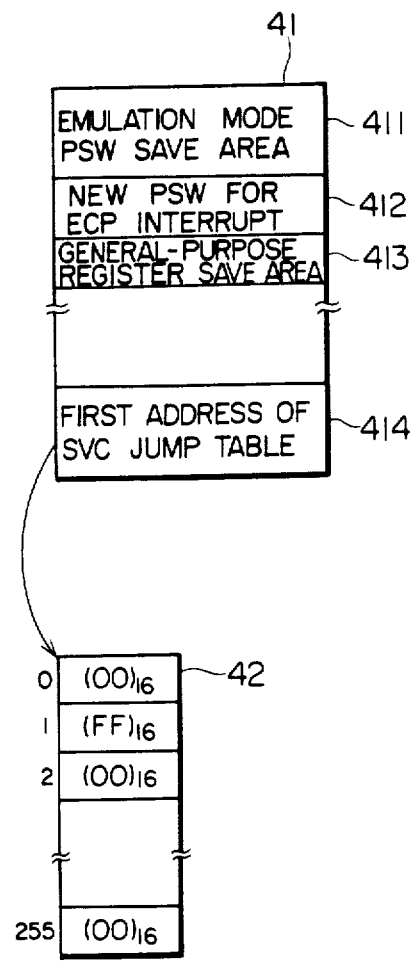
FIG. 4 is a schematic diagram illustrating a local execution list.

The EXL instruction format consists of an instruction code part (EXL), a B₂ part comprising four bits for indicating a general-purpose register to be assigned as the base register, and a D₂ part comprising 12 bits which indicate a binary value. When an EXL instruction is issued, the second operand address is register specified by the B₂ part to the D₂ part. The second operand address indicates an address on the main storage device at which a local execution list 41 (FIG. 4) is stored. The local execution list 41 comprises an area 411 for saving the emulation mode PSW necessary for the emulator operation, an area 412 for storing therein the new PSW for the ECP interrupt, a general-purpose register save area 413, an area for storing therein the first address of the jump table for the superviser call (SVC) instruction, and other areas. When the EXL instruction is executed, the pertinent values are set to the PSW, general-purpose register, etc. in the local execution list 41, then the system enters the local execution (emulator operation) mode.

In accordance with the emulation method of the present invention, since an input/output control instruction specified by the user program 24 in the emulated program 22 is issued in the form of an input/output macro instruction of the operating system 23 in the emulated program 22, and it is ordinarily an interrupt instruction, such as an SVC instruction, to the operating system 23; the input/output instruction is emulated at the macro instruction level rather than at the machine language level which has been adopted in the conventional emulation method.

This facilitates the translation operation for translating an input/output control macro instruction issued in the target machine user program 24 into the corresponding input/output control instruction for the native machine operating system 10; moreover, the necessity to perform the processing for each of a plurality of input/output instructions is obviated; thereby realizing an emulation with a minimized overhead.

In accordance with the present invention, when an SVC instruction is detected during the execution of the emulated program 22, the micro program for executing the emulation searches the entries of the local execution list 41 (FIG. 4) for the SVC jump table first address entry 414. Each entry of the table 42 is referenced by use of the entry 414 stored in the local execution list 41. Then, the instruction is examined to determine whether or not it is a supervisor call instruction associated with an input/output control macro instruction. If it is found, as the result of the examination, to be a supervisor call instruction for an input/output control instruction, the operating system 23 for the emulated program 22 is not interrupted and the emulation mode is released, then an interrupt is caused in the interface program, that is, ECP 21 which operates in the native mode. The ECP 21 analyses and translates the input/output control instruction issued from the emulated program 22 into an input/output control macro instruction for the native mode operating system 10, then issues the obtained instruction.

Figure 3:
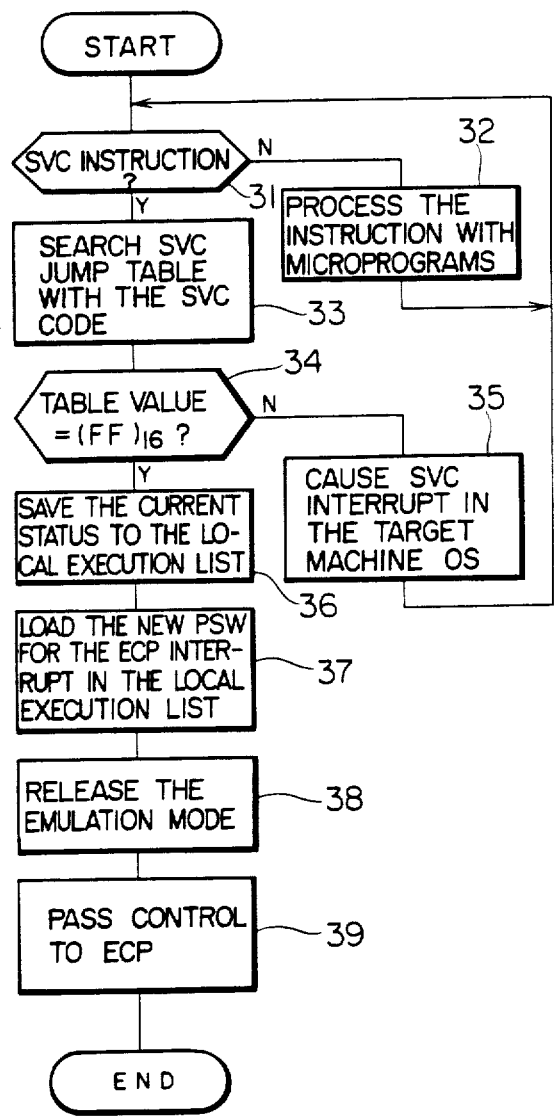
FIG. 3 is the processing flowchart for an emulation.

FIG. 3 depicts the processing flowchart of the emulation method in accordance with the present invention.

The flowchart of FIG. 3 covers the operations of the emulation microprogram up to the translation of an input/output control macro instruction.

If the emulation program detects a supervisor call (SVC) instruction while sequentially executing machine language codes of the target machine, it references the area 414 in the local execution list (emulation mode control table) 41 established when the emulator is initiated (FIG. 4), and obtains one of the table entry, the first address of the SVC jump table 42 (steps 31 and 33). Then the microprogram references a value stored in a byte at an address corresponding to a combination of the obtained first address and the SVC code (0-255 indicating the operand value of SVC instruction) of the jump table 42. This value of SVC jump table 42 has been coded in advance by checking the SVC code in the target machine operating system 23 and contains (FF)₁₆ for an entry corresponding to an SVC code which is associated with an input/output control instruction or a value other than (FF)₁₆ for other entry. The emulation microprogram tests the entry value of the table 42. If the value is other than (FF)₁₆ corresponding to an SVC code, it regards the instruction as an SVC instruction that can be processed on the target machine operating system 23 and carries out the emulation to perform SVC operation as predetermined in accordance with the target machine architecture (steps 34–35). If the entry value is (FF)16, the emulation microprogram regards the instruction as an SVC instruction which is associated with an input/output control macro instruction, saves the PSW indicating the current emulation mode state to the PSW save area 411 in the local execution list 41 depicted in FIG. 4, and at the same time, loads the new ECP interrupt PSW (412) indicating the entry address of the EPC 21 for translating the input/output control macro instruction of the target machine into the PSW, then releases the emulation mode and transfers control to the ECP 21 (steps 36–39).

As explained above, under control of the emulation micro program, an SVC instruction associated with an input/output control macro instruction is detected and control is passed to the EPC 21.

The ECP 21 can obtain the SVC instruction address by referencing the local PSW 412, hence it is able to read a group of parameters related to the input/output control which is associated with the SVC instruction and thus can easily perform the translation to obtain an input/output macro instruction for the native machine operating system 10.

This completely avoids any need for the operation of the input/output control macro instruction processing routine included in the target machine operating system 23, thus the software overhead is greatly reduced.

We claim:

1. An emulation method for emulating programs in a system having a target machine and a native machine, and in which data processing is conducted in the target machine with a plurality of programs having a different instruction word set than the native machine, comprising the steps of:
    a. detecting an interrupt instruction defined in a first program in which an instruction of said target machine is executed;
    b. determining whether or not said interrupt instruction is an input/output control macro instruction by use of an operand value of said interrupt instruction; and
    c. if said interrupt instruction is determined to be an instruction associated with an input/output control macro instruction in said step b, bypassing the operation system of said target machine by translating said input/output control macro instruction from said first program into an input/output control macro instruction for a second program, in which an instruction of said native machine is executed, under control of a program for controlling said emulation.

2. An emulation method according to claim 1, further comprising the step of:
    d. causing an interrupt in an operating system for said first program is said interrupt instruction is not determined to be an instruction associated with an input/output control macro instruction in said step b.

3. An emulation method of emulating programs in a system having a target machine and a native machine, and in which data processing is conducted in the target machine, with a plurality of programs having a different instruction work set than the native machine, comprising the steps of:
    a. detecting an interrupt instruction existing in a first program in which an instruction of said target machine is executed;
    b. searching a table by use of an operand of said interrupt instruction;
    c. determining whether or not the value of a code obtained from said table is equal to a predetermined value;
    d. saving a program status word indicating the current emulation mode in a predetermined memory area if said value is determined to be equal to said predetermined value in said step c;
    e. loading said program status word as an interrupt in an emulation program; and
    f. releasing said emulation mode and bypassing the operating system of said target machine by translating an input/output control macro instruction from said first program into an input/output control macro instruction for a second program in which an instruction of said native machine is executed.

* * * * *